Patented July 15, 1930

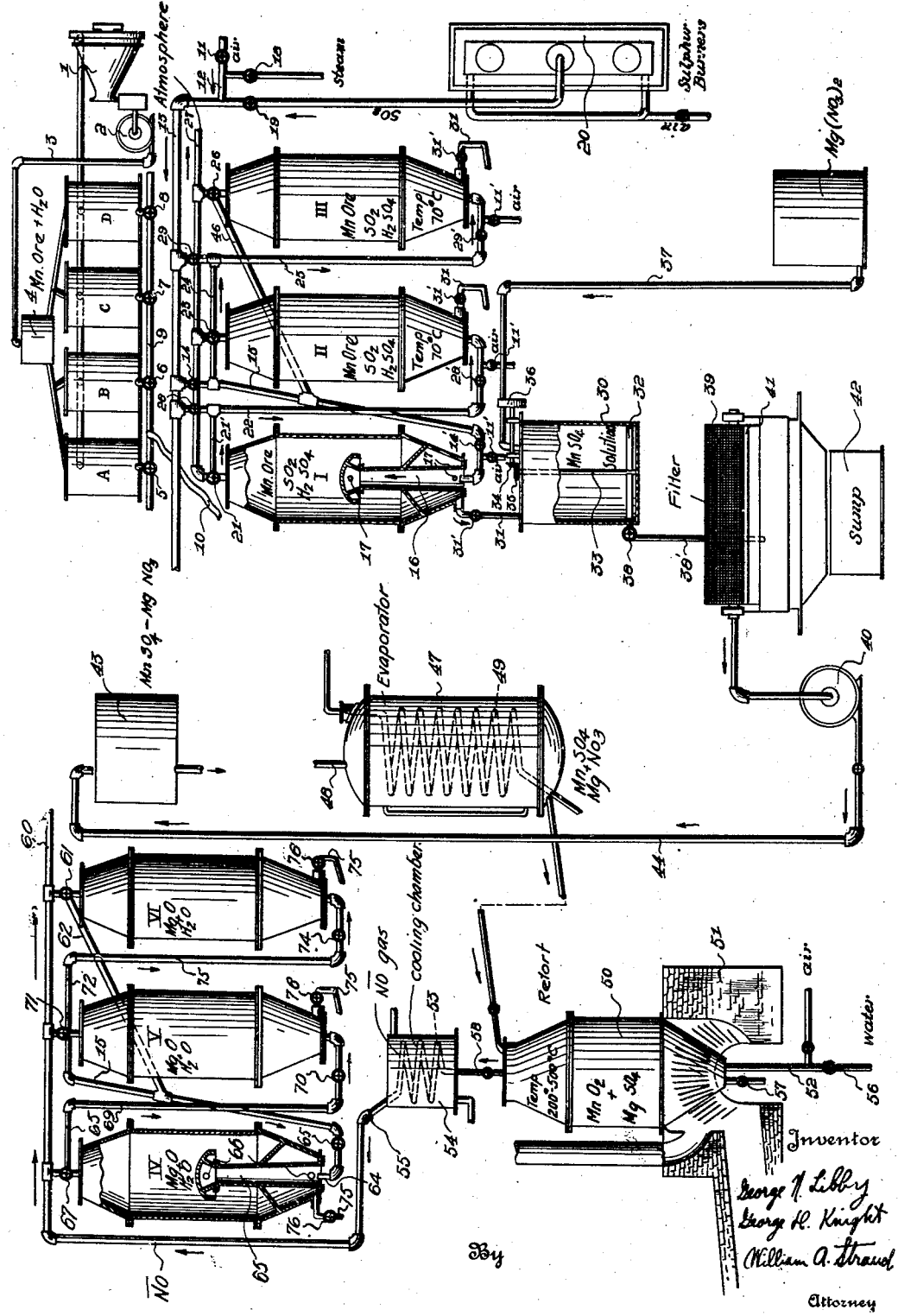

1,770,791

UNITED STATES PATENT OFFICE

GEORGE N. LIBBY, OF PARADISE, AND GEORGE D. KNIGHT, OF REDWOOD CITY, CALIFORNIA, ASSIGNORS TO EMORY WINSHIP, OF MACON, GEORGIA

PROCESS FOR TREATING MANGANESE ORES AND THE LIKE

Application filed April 12, 1926. Serial No. 101,432.

The present invention relates to manganese containing materials and processes of producing such materials.

More particularly the invention relates to the production of the higher oxides of manganese which are especially adapted for use in the production of dry cells and electric batteries; for use as oxydizing agents; and for use in medical compositions; paints; pipe joint preparations and the like.

In carrying out the preferred forms of the invention, manganese ores containing either manganese peroxide or dioxide, or compounds of oxides containing less oxygen than corresponds to the dioxide form, associated with silica and other impurities are treated in such manner that the manganese is obtained in the form of the higher oxide or peroxide substantially free from impurities.

Manganese peroxide or dioxide ($MnO_2$) to be satisfactorily employed in the manufacture of batteries must possess the property of being highly active or must freely liberate its available oxygen and it should be substantially free from impurities such as metals which may cause destructive reactions to be set up in the electrolytic substance itself or between electrodes of the battery. Manganese dioxide for battery manufacture should contain less than 1 percent of iron, and under .03 percent of copper.

Accordingly, an object of the present invention is to provide a process for obtaining manganese dioxide or peroxide in a substantially pure state from ores containing manganese in the dioxide form or in the form of oxides lower than the dioxide, at low cost and in a commercially practicable manner.

Another object of the present invention is to provide a process for removing the impurities from various manganese ores whereby a manganese material susceptible of a high degree of oxidation, and useful in battery manufacture may be produced.

Still another object of the present invention is to provide a process whereby a substantially pure and highly active manganese peroxide in a finely divided condition is produced.

A further object of the present invention is to provide a cyclic process whereby a substantially pure manganese peroxide is produced and the waste products resulting from the practice of the process are recovered in a form available for reuse in the process whereby the cost of operation is materially reduced.

Further objects of the present invention will appear from the detailed description of the invention set forth hereinafter and are defined by the scope of the appended claims.

Apparatus suitable for carrying out the process is illustrated in the accompanying drawing.

Referring to the drawing, 1 represents a ball mill wherein the manganese containing ore is ground to a fineness of about 80 mesh in the presence of water. The finely ground ore together with the water from the ball mill is raised by pump 2 through pipe line 3 to a receptacle 4 in which large pieces of ore settle out. From the receptacle 4 the mixture of ground ore and water is passed through a series of dewatering tanks A, B, C, D, etc., in which the ore settles to the bottom of the tanks in well known manner, while the excess water is returned to the ball mill for further use in grinding operations. The dewatering tanks are preferably of such size that each tank holds, when filled, a charge of ore for a digester. The tanks are connected in such manner that when any one is filled with settled ore it may be cut out of the series and the mixture of water and ore passed through the remaining tanks. A sufficient number of dewatering tanks is utilized to trap all of the ore carried in the water before it is finally returned to the ball mill 1 for reuse. Arrangements of this type are commonly used for the crushing of ores and any of the well known arrangements may be utilized.

To charge the digesters with ore, one of the filled dewatering tanks A to D is cut out of the series and the settled ore is flushed out with water through the corresponding valve 5 to 8 into a pipe 9 from which it is passed into the digester to be charged, through a suitable opening provided with a removable pressure tight cover (not shown) by means of a flexible hose connection 10. Sufficient water may be used in flushing the settled ore in the digester to supply the necessary water for the charge.

By the addition of concentrated sulphuric acid to the digesters, clogging of the filters in the filtering stages and evolution of the nitrous fumes in the evaporation stages which otherwise occur, are avoided. The clogging of filters and formation of nitrous fumes when the acid is not added is believed to be due to the formation of dithionates from the lower oxides of manganese present in the ore under treatment. In treating California ores containing approximately 40 percent manganese dioxide, about a gallon of concentrated sulphuric acid for each ton and one-half of ore as settled in the dewatering tanks is sufficient to prevent the clogging of filters and formation of nitrous oxide. It will be understood, however, that the amount of sulphuric acid to be added to the digesters will vary with the different types of ores and may be determined experimentally or by analysis of the ore for the lower oxides of manganese.

To start the system into operation, the requisite amount of concentrated sulphuric acid is first added to the digesters which are loaded in turn with charges of ground ore and a quantity of water sufficient to permit continuous agitation of the ore in water and in an amount depending upon the strength of the manganese sulphate solution desired to be formed. As soon as the mixture of water and ore starts to flow into digester I, valve 11 in the air line 12 is opened, and air under pressure is forced through pipes 12 and 13, valves 14 and 14', pipe 15, up through tubular section 16. Tubular section 16 is provided with openings 17 at the bottom and top thereof. The ore and water mixture enters the openings at the bottom of section 16 and is carried upward by the air and discharged through the upper openings 17, settles to the bottom of the conical section of the digester, re-entering the tubular section 16 through the openings 17 at the bottom hereof. In this way continuous agitation of the ore and water mixture contained within the digester is maintained. After digester I is charged and the charging opening is closed, the air from the top of digester I, through valve 21, pipe 21' and pipe 22, into the digester II, which is similar to digester I in construction, agitating the mixture of ground ore and water in digester II in the manner set forth in connection with digester I. After digester II is charged and the charging opening is closed, the air passes out through valve 23 and pipes 24 and 25 to the bottom of digester III similar in construction to digesters I and II. After passing through digester III and agitating the contents thereof, when digester III is charged and closed, the air is exhausted therefrom through valve 26 and pipe 27 to atmosphere.

After the digesters have been loaded, the contents are preferably heated to aid the reactions. This heating is effected by opening valve 18 and admitting live steam with the air circulating through the system. After digester I has been heated to a temperature of about 70 degrees C. corresponding approximately to the temperature of the $SO_2$ gases utilized, valves 11 and 18 are closed, and simultaneously therewith valve 19 is opened permitting $SO_2$ gas from sulphur burners 20 to circulate through the system in place of the air and steam. The $SO_2$ gas circulates through the system maintaining the agitation and reacting with the charges, forming a solution of manganese sulphate in the water present. During the first part of the digesting period most of the $SO_2$ gas will react with the products in digester I and very little will reach digesters II and III. As the reactions in digester I approach completion increasing quantities of the $SO_2$ gas passes into the succeeding digesters. With a charge in the digesters of one and one-half tons of settled ore, several hours will be required for the completion of the reaction in digester I.

After the digestion with $SO_2$ gas has been continued for several hours, the contents contained in digester I are tested to ascertain whether or not the reactions have been completed. This is determined by tapping a sample from the digester through a suitable sampling cock and noting the amount of black sediment that settles in the bottom of the sample. This black sediment is the manganese product in the ore, and when only a slight quantity settles the reactions are completed. If the reactions are carried to the point where no black sediment appears the charge is overdone and a perceptible odor of $SO_2$ gas will emanate from the sample. If the charge is overdone, there is a tendency for the filter presses to clog during the filtering stage. When no black sediment appears, or a strong odor of $SO_2$ emanates from the sample, a quantity of fresh ore is added to the digester and the treatment with $SO_2$ is continued for a few minutes when it will be found that the charge will reach the proper digested condition. After the charge reaches a properly digested condition digester I is cut out of the series by closing valves 14, 14' and 21, and $SO_2$ gas is then admitted directly to digester II from the line 13 through pipe 22 by opening the valve 28. The mass in digester I which is largely a solution of manganese sulphate is then tested for the presence of iron and aluminum compounds and other impurities in solution. This test is carried out in any well known manner. If iron, aluminum or like compounds, or other impurities such as phosphoric acid and the like in solution are found to be present, the valve 11' is opened admitting air under pressure through pipe 15 into section 16 to agitate the mass, and an alkaline substance such for example as any metal oxide, hydroxide or carbonate, or any reactive alkaline earth oxide, hydroxide or carbonate, preferably calcium carbonate, calcined magnesite, and the like, is added through the manhole which remains open, to the contents of the digester in sufficient quantity to precipitate the iron, aluminum and other impurities in solution. Of the alkaline substances mentioned above I prefer to use light calcined magnesite as this compound results in the final formation of a desirable magnesium sulphate solution. The agitation is continued with the manhole open to effect a complete and thorough reaction and the iron is precipitated in a form which is readily separated by filtration. It is believed that the iron in ferrous state contained in the ore is converted to the ferric state by the presence of oxidizing agents such as the air used for agitation. It is to be noted that by our improved process the addition of oxidizing agents such as nitric acid is not necessary at this stage to convert the ferrous iron to the ferric state for precipitation, resulting in an improved process.

After the iron compounds in solution have been precipitated, the contents of digester I are ready to be discharged into a receptacle for subsequent treatment. The charging opening is then closed and air is preferably admitted into the digester until a sufficient pressure has been built up to blow the charge out through the pipe 31. Valve 31' is then opened and contents of digester I are discharged into receptacle 30 through pipe 31. Receptacle 30 is provided with an agitator 32 which is operated through the medium of shaft 33, gears 34, and 35 and pulley 36. As the contents of digester I are being discharged into receptacle 30 a solution of a metal nitrate of suitable strength such as the nitrate of sodium, potassium, lithium, magnesium, zinc, or cadmium, and preferably magnesium nitrate $(Mg(NO_3)_2)$ is added to and mixed with the sulphate solution through pipe line 37 from a suitable supply source. The mixture of manganese and nitrate solutions is agitated and conditions the remaining substances and impurities such as clays, silicates, and the like so they will separate from the solution by mechanical filtration or decantation. After this operation is completed, the valve 38 is opened and the mass is passed through pipe 38' to a suitable filter 39. As shown filter 39 is of the rotary type and the mass to be filtered is contacted with the outer surface of a drum covered with suitable filtering fabric. The liquid is drawn through the fabric into the drum and through suitable valves, not shown, by centrifugal pump 40. The liquid containing manganese sulphate and magnesium or other nitrates as the case may be in solution is raised to receptacle 43 through the medium of piping 44. The solution in receptacle 43 is tested for the presence of copper and like impurities in any well known manner, and if such impurities are present, a small percentage of metallic aluminum or aluminum dross sufficient in quantity to throw out or remove the impurities from the solution is added to receptacle 43 and the mass is then agitated until tests show that the copper and like impurities have been removed or thrown out from the solution.

As above set forth, when digester I is cut out of the series, digester II becomes the first digester and digester III becomes the second in the series. After digester I has been discharged, air is admitted thereto through valve 11' and a new charge of ore and water is added as above set forth. When the new charge is in digester I, it is heated to approximately 70 degrees C. by steam admitted with the agitating air through valve 11', valve 11' is then closed, valve 26 is changed to direct the $SO_2$ gas from digester III, through pipes 46 and 15, valve 14, and 21 are opened and valve 11' is closed. Digester I then becomes the third digester in the series and the $SO_2$ gas from digester III passes upward through digester I and valve 21 into the exhaust line 27.

When digester II is ready to be tested for the presence of iron as set forth in connection with digester I, valve 23 is positioned to cut off the digester from the system, valves 28 and 28' are closed. This cuts digester II out of the series, and digesters III and I become the first and second digesters respectively, of the series. The further treatment of the charge in digester II is carried out in the manner set forth in conection with digester I and the mass is discharged into receptacle 30 for treatment with magnesium nitrate solution as above set forth. A new charge of ore and water is loaded into digester II, the contents are heated to about 70 degrees C. by injecting steam with the agitating air through valve 11' individual thereto, valve 11' is then closed, valve 21 is set to direct the $SO_2$ gas from digester I into pipes 21' and 22, valve 28' is opened and valve 23 is positioned to discharge the gas from digester II into the exhaust line 27. In this way digester II becomes the third digester in the series. When the charge in digester number III is completed the digester is cut out of the series by closing valves 29, 29' and 26, and valves 14 and 14' are opened again making digester I the first in the series. The charge in digester III is then treated as above set forth, passed through receptacle 30, treated with magnesium nitrate, filtered and discharged into receptacle 43 where the copper is thrown out. Digester III is loaded with a new charge of ore and water which is then heated and the digester is cut back into the series as the third digester by setting valve 23 to direct the gases from digester II through pipes 24 and 25, opening valve 29' closing valve 11' and positioning valve 26 to direct the gas from digester III to the exhaust pipe 27. In this way it will be seen that the charges in the digesters are successively brought to a completely reacted state without loss of $SO_2$ gas and with a maximum degree of efficiency, permitting the remaining steps in the process to be carried with a minimum amount of equipment and at a minimum cost for a given output.

The cake from a filter of the rotary type disclosed may contain approximately 10 percent or more of liquor. This cake is agitated with water, the resultant mixture is settled or filtered, giving a weak solution of manganese sulphate and magnesium nitrate which may be charged into the digester in place of water, or may be used in forming the solution of magnesium nitrate used in the process.

The solution containing a mixture of manganese sulphate and magnesium or other nitrate with copper content removed, contained in receptacle 43 is then introduced into evaporator 47 which may be of any well known and suitable type, through an inlet pipe 48. The evaporator 47 as shown is provided with an acid resisting coil 49 for the circulation of a heating medium therethrough. A vacuum is preferably maintained in the evaporator by means of a suitable vacuum pump, not shown, and the solution is concentrated to a specific gravity, preferably of 1.6. The concentrated solution may be then introduced into a retort 50. The retort 50 is mounted in a fire box 51 and is so constructed that a current of air may be forced or drawn into the bottom of the retort through the air supply pipe 52. The concentrated solution contained in the retort 50 is heated to a temperature sufficient to cause the manganese sulphate and magnesium nitrate contained therein to be converted into manganes nitrate and magnesium sulphate, and to decompose the manganese nitrate into manganese dioxide and nitrous oxide. To accomplish these reactions the mass in the retort must be heated as the conversion of manganese sulphate to manganese nitrate and the decomposition of the manganese nitrate requires the application of heat. When magnesium nitrate is used the reactions proceed most effectively at a temperature of approximately 200 to 500 degrees C. or higher. The retort is accordingly preferably heated from 200 to 500 degrees C. and at such temperatures the manganese sulphate and magnesium nitrate react and form magnesium sulphate and magnesium nitrate, the last named compound being in turn converted into manganese dioxide and nitrous oxide. The nitrous oxide fumes liberated as a result of the decomposition of the manganese nitrate formed by the reaction of the manganese sulphate and magnesium nitrate contained in the concentrated solution introduced into the retort are converted into nitric oxide by the contaction of the air entering the retort through the pipe 52. The nitric oxide fumes formed within the retort 50 are exhausted through the pipe 58 and are passed through a coil 53 which is immersed in cooling water in the container 54, and in which the nitric oxide fumes are preferably cooled to the point where the reactions in tower 1, to which the fumes are passed from the coil 53, are maintained at temperatures below 50° C.

A series of towers I, II, and III are provided which are of the same construction and interconnected in the same manner as the digesters I, II, and III with the exception that air inlets 11 and 11', the sulphur burners, and steam supply pipes are eliminated. To avoid needless duplication of description the same reference characters have been applied to the tower arrangement and connections as have been applied to similar parts in the digester arrangement and interconnections and a reference to the description of the digester arrangement heretofore given may be had for a full understanding of the tower arrangement.

The towers are charged with finely ground magnesite and a sufficient quantity of water to permit circulation of the contents to be set up by the gases containing nitric fumes and air which pass through pipe 55 into feed line 60, through pipe line 62, valve 63, nozzle 64 into tubular section 65 of the digester IV. The tubular section 65 is provided with openings 66 at the bottom and top thereof. The magnesite and water mixture enters the openings at the bottom of section 65 and is carried upward by the gases containing nitric oxide fumes and discharged through the upper openings 66, settles to the bottom of the conical section of the digester, re-entering the tubular section 65 through the openings 66 at the bottom thereof. In this way continuous agitation of the magnesite and water mixture contained within the digester is maintained.

The gases containing nitric oxide fumes not retained within digester IV pass out of said digester through the valve 67 into pipe lines 68, 69, through valve 70 into the bottom of digester V also containing a mixture of magnesite and water. The gas mixture containing nitric oxide fumes passes out of digester V through valve 71 into pipe lines 72 and 73 through valve 74 into the bottom of digester VI which also contains a mixture of magnesite and water. The gas containing traces of nitric oxide then passes upwardly through the digester VI and out of said digester through valve 61 into pipe line 60, and then to the atmosphere. Each of the digesters IV, V and VI, are provided with discharge pipes 75 adjacent the bottom thereof controlled by valves 76 for the withdrawal of the magnesium nitrate from the said digesters.

The gases pass into the first tower of the series agitating the mixture, reacting with the ground magnesite to form a solution of magnesium nitrate, and carbon dioxide is evolved. The gases from the first tower pass through the second and third tower in the series reacting with the charges until the nitric oxide fumes have been entirely converted into magnesium nitrate. The gases which leave the third tower in the series through the pipe 60 consist largely of carbon dioxide and are conducted to either a storage receptacle or compressor (not shown) to be used in processes wherein carbon dioxide gas is utilized as, for example, in the production of basic magnesium carbonate adapted for insulating purposes.

When the charge in the first tower of the series has been reacted to the desired degree, and the tower is to be discharged, it is cut out of the series, and the second tower becomes the first in the series in the manner fully set forth in the description of the digester manipulation. The completed solution of magnesium nitrate is then withdrawn from the tower and passed into the supply reservoir for the receptacle 30 to be used in the treatment of the manganese sulphate solution from the digesters.

When no more nitric oxide fumes are liberated from the retort 50 the charge contained within the retort is completed. The fire is then shut off, the retort allowed to cool, and water admitted through pipe 56, mixed with the mass in the retort which consists of manganese dioxide in a finely divided or powdered form associated with anhydrous magnesium sulphate. The mixture of water and the reacted mass is then agitated by the admission of air through pipe 52. The magnesium sulphate which is extremely soluble in water readily dissolves in water during the agitation. After the magnesium sulphate is dissolved, the retort 50 may be closed and air under pressure sufficient to blow out the liquid mixture comprising the manganese dioxide suspended or admixed with the magnesium sulphate solution, is admitted into the retort. The charge is then blown out of the retort through pipe 57 and is led to a filter, not shown, where the manganese dioxide is separated from the magnesium sulphate solution, washed and dried for shipment or storage. Instead of blowing out the charge from the retort it will be understood that any well known method of removal may be utilized.

In place of treating the charge consisting of a mixture of manganese dioxide associated with anhydrous magnesium sulphate in the manner just described to effect a separation of the manganese dioxide from the magnesium sulphate, the charge may be withdrawn from the retort and packed and stored in suitable containers for future use. In other words, this product which consists of a mixture of manganese dioxide and anhydrous magnesium sulphate may be sold as an article of commerce. All that the consumer would be required to do with such article in order to separate the magnesium sulphate from the manganese dioxide would be to subject it to a leaching operation, the magnesium sulphate going into solution and the manganese dioxide remaining suspended in the solution. The separation of two compounds could then be effected by either filtration, decantation, or sedimentation.

The magnesium sulphate in either case is then subjected to evaporation and recrystallization to recover the magnesium sulphate therefrom in the form of Epsom salts in a substantially pure state.

It is to be noted in this connection that the reactions which take place in the process as above described are believed to be as follows:

(1) $MnO_2 + SO_2 + aq = MnSO_4$ (2) $MnSO_4 + Mg(NO_3)_2 + Heat = MgSO_4 + MnO_2 + 2\overline{NO_2}$ From the above reactions utilizing the molecular weights the following theoretical proportions per ton of $MnO_2$ are attained:

| Required | Produced |
|---|---|
| Sulphur 0.36 tons | Manganese dioxide 1 ton |
| Magnesite 0.97 tons | Epsom salts 2.8 tons |
| $HNO_3$ recovered | $CO_2$ 0.5 ton |

From the above it can be seen that for each ton of pure manganese dioxide produced, there is produced 2.8 tons of Epsom salts and also one-half ton of carbon dioxide. The production of these two by-products, namely, Epsom salt and carbon dioxide materially reduces the cost of production per ton of substantially pure manganese dioxide. The carbon dioxide produced by this process is of sufficient purity to be utilized in the production of basic magnesium carbonate, a compound which is utilized extensively in in the production of insulating materials.

Having described a preferred embodiment of the invention, what is claimed as new and desired to be secured by Letters Patent is:

1. In the process of obtaining manganese dioxide from ores containing it, the steps which comprise reacting sulphur dioxide with finely divided ore in the presence of water, and treating the manganese sulphate thus formed with magnesium nitrate.

2. In the process of obtaining manganese dioxide from ores containing it, the steps which comprise reacting sulphur dioxide gas with a mixture of finely divided ore and water, treating the manganese sulphate thus formed with a magnesium nitrate solution, filtering the reacted mass, and converting the manganese contained in the liquid mixture thus formed into manganese dioxide.

3. In the process of obtaining manganese dioxide from ores containing it, the steps which comprise reacting sulphur dioxide gas with a mixture of ore and water at a temperature of about 70° C., precipitating the impurities contained in the manganese sulphate thus formed, and treating the manganese sulphate solution with magnesium nitrate.

4. In the process of obtaining manganese dioxide from ores containing it, the steps which comprise converting the manganese dioxide contained in the ore into manganese sulphate, treating the manganese sulphate with magnesium nitrate, and recovering the manganese from the reacted mass in the form of manganese dioxide in a substantially pure state.

5. In the process of obtaining manganese dioxide from ores containing it, the steps which comprise converting the manganese dioxide contained in the ore into manganese sulphate, treating the manganese sulphate with magnesium nitrate, converting the manganese sulphate-magnesium nitrate mixture thus formed into manganese dioxide, and recovering the manganese dioxide thus formed in a substantially pure state.

6. The process of obtaining manganese dioxide from ores containing it, which comprises converting the manganese dioxide contained in the ore into manganese sulphate, precipitating the iron associated therewith, treating the manganese sulphate thus formed with magnesium nitrate, filtering the reacted mass to separate the impurities therefrom, converting the manganese sulphate contained in the filtrate into manganese dioxide, recovering the manganese dioxide in a substantially pure state, and recovering the nitric oxide in the form of magnesium nitrate for reuse in the process.

7. The process of obtaining manganese dioxide from ores containing it, which comprises causing sulphur dioxide gas to react with the ore suspended in an aqueous medium, treating the manganese sulphate solution thus formed with magnesium nitrate, filtering the reacted mass, converting the manganese sulphate contained in the liquid mixture thus formed into manganese dioxide, and recovering the nitric oxide gas in the form of magnesium nitrate for reuse in the process.

8. In the process of obtaining manganese dioxide from ores containing it, the steps which comprise concentrating a solution containing manganese sulphate and magnesium nitrate, and heating the concentrated solution to a temperature sufficient to convert the manganese sulphate into manganese dioxide.

9. In the process of obtaining manganese dioxide from ores containing it, the steps which comprise concentrating a solution containing manganese sulphate and magnesium nitrate, heating the concentrated solution to a temperature sufficient to convert the manganese nitrate into manganese dioxide, and recovering the manganese dioxide.

10. In the process of obtaining manganese dioxide from ores containing it, the steps which comprise concentrating a solution containing manganese sulphate and magnesium nitrate, heating the concentrated solution to a temperature sufficient to convert the manganese nitrate into manganese dioxide, treating the reacted mass with water, and filtering to separate the manganese dioxide from the solution of magnesium sulphate.

11. In the process of obtaining manganese dioxide from ores containing it, the steps which comprise concentrating a solution containing manganese sulphate and magnesium nitrate, heating the concentrated solution to a temperature of about 500° C., treating the reacted mass with water, and separating the manganese dioxide thus formed from the solution of magnesium sulphate.

12. In the process of obtaining manganese dioxide from ores containing it, the steps which comprise heating a solution containing manganese sulphate and magnesium nitrate, to a temperature of about 500° C., withdrawing the nitric oxide fumes as formed, and causing the nitric oxide fumes to contact with an aqueous suspension of finely divided magnesite to form magnesium nitrate for use in the process.

13. In the process of obtaining manganese dioxide from ores containing it, the steps which comprise heating a solution containing manganese sulphate and magnesium nitrate, to a temperature of about 500° C., withdrawing the nitric oxide fumes as formed, causing the nitric oxide fumes to contact with an aqueous suspension of finely divided magnesite to form magnesium nitrate, recovering the magnesium nitrate thus formed for reuse in the process, treating the reacted mass with water, and separating the manganese dioxide thus formed from the solution of magnesium sulphate.

In testimony whereof we affix our signatures.

GEORGE N. LIBBY.
GEORGE D. KNIGHT.